United States Patent Office
3,699,053
Patented Oct. 17, 1972

3,699,053
FUNCTIONAL FLUID ANTIOXIDANTS
William F. Gentit, Mohegan Lake, N.Y., assignor to
Stauffer Chemical Company, New York, N.Y.
No Drawing. Filed Jan. 28, 1971, Ser. No. 110,613
Int. Cl. C09k 3/02
U.S. Cl. 252—403
8 Claims

ABSTRACT OF THE DISCLOSURE

An antioxidant composition comprising a mixture of:
(A) A monoacylated phenylene diamine of the formula

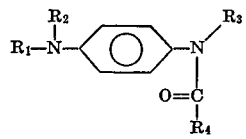

wherein $R_1$ and $R_3$ can each be alkyl, cycloalkyl, aryl, aralkyl or alkaryl; $R_2$ can be hydrogen, alkyl, cycloalkyl, aryl, aralkyl or alkaryl; and $R_4$ can be hydrogen, alkyl, phenyl, substituted alkyl or substituted phenyl, and
(B) A secondary aryl amine is disclosed. These compounds show superior and unexpected high temperature antioxidant and fluid stabilizing properties with very little deposit formation when incorporated into polycarboxylate functional fluids.

BACKGROUND OF THE INVENTION

The use of aryl amines as antioxidants for synthetic ester functional fluids is well known in the art. Thus, the secondary aryl amines such as the phenyl naphthyl amines, the diphenyl amines and the like have been found to decrease the amount of sludge buildup in the fluid. Unfortunately, these materials have proven unsatisfactory in stabilizing the fluids against changes in viscosity and acid number; problems which can be very detrimental to the high temperature performance needed in modern jet engines. Hindered phenolic type compounds, including phenolic amine compounds of the type disclosed in British Pat. No. 1,096,433, have been used as antioxidants but these materials tend to be corrosive. British Pat. No. 1,145,740 has suggested acylating the phenolic amines of British Pat. No. 1,096,433 to give better corrosion characteristics in hydrocarbon oil and dicarboxylate type fluids. None of these materials, however, have adequately solved the problems of acid buildup and viscosity change mentioned above.

It is, therefore, an object of the present invention to provide antioxidants which will stabilize polycarboxylate type esters against changes in acid number and viscosity.

DETAILED DESCRIPTION OF THE INVENTION

The present invention relates to high temperature antioxidants for polycarboxylate functional fluids. More particularly, the present invention relates to a high temperature antioxidant, comprising a mixture of an acylated phenylene diamine and a secondary aryl amine.

The acylated phenylene diamines employed in the present composition have the formula corresponding to:

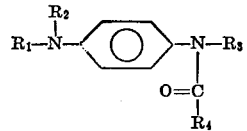

wherein $R_1$ and $R_3$ can each be alkyl, cycloalkyl, aryl, aralkyl or alkaryl; $R_2$ can be hydrogen, alkyl, cycloalkyl, aryl, aralkyl or alkaryl; and $R_4$ can be hydrogen, alkyl, phenyl, substituted alkyl or substituted phenyl.

In the preferred embodiment of the present invention $R_1$ and $R_3$ can each be a $C_{1-20}$ alkyl, a $C_{5-18}$ cycloalkyl, phenyl, a $C_{7-26}$ alkylphenyl, naphthyl or $C_{11-30}$ alkylnaphthyl; $R_2$ is hydrogen, and $R_4$ is $C_{1-20}$ alkyl, phenyl, substituted alkyl or substituted phenyl. The terms substituted alkyl and substituted phenyl as used herein are meant to designate alkyl or phenyl groups having attached thereto at least one substituent of the type: halogen, cyano, carboxyl, carboxylate, amido, amino, nitro hydroxy or alkoxy. Illustrative of these compounds are the following:

N-heptanoyl-N,N'-di-sec-butyl-p-phenylene diamine,
N-hexanoyl-N,N'-di-sec-butyl-p-phenylene diamine,
N-benzoyl-N,N'--di-sec-butyl-p-phenylene diamine,
N-heptanoyl-N,N'-bis(3,5-methylheptyl)-p-phenylene diamine,
N-heptanoyl-N,N'-bis(1,4-dimethylpentyl)-p-phenylene diamine,
N'-heptanoyl-N-phenyl-N'-(1,3-dimethylbutyl)-p-phenylene diamine; and the like.

The acylated phenylene diamines are normally employed in amounts ranging from about 0.1 to about 10% by weight of the entire fluid.

These compounds are prepared by acylating a phenylene diamine of the formula:

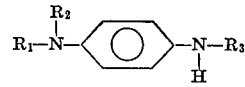

wherein $R_1$, $R_2$ and $R_3$ are as designated above. This acylation can be carried out according to any of the well known acylation reactions. Thus, the phenylene diamine can be reacted with a carboxylic acid of the formula

at an elevated temperature, normally in the range from about 100 to about 300° C. Alternately, the phenylene diamine can be reacted with an acid anhydride of the formula:

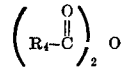

at a temperature in the range from about 20 to about 200° C. The third method involves reacting the phenylene diamine with an acid chloride of the formula

at a temperature in the range from about 20 to about 150° C. When employing the third route, an acid acceptor such as a tertiary amine can be employed to improve the yield and prevent side reactions. Pyridine appears to be particularly suitable for this purpose although any of the art recognized acid acceptors can be employed.

The secondary aryl amines of the present invention are well known in the art. The term "secondary amine" as used herein is meant to designate compounds having the formula corresponding to:

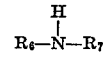

wherein $R_6$ and $R_7$ are phenyl, naphthyl, $C_{1-20}$ alkyl substituted phenyl, and $C_{1-20}$ alkyl substituted naphthyl. The preferred compounds for the present invention are: phenyl-α-naphthyl amine, phenyl-β-naphthyl amine, octylphenyl-α-naphthyl amine, octylphenyl - β - naphthyl amine, diphenyl amine and p,p'-dioctyl diphenyl amine.

The secondary aryl amines are normally employed in amounts from about 0.01% to about 10% by weight of the entire fluid. They are preferably present in a weight ratio to the acylated phenylene diamine of from about 3:1 to about 0.3:1.

The antioxidants of the present invention are employed in functional fluids of the polycarboxylate type. The term "polycarboxylate" as used herein is meant to designate those materials having between 2 and 8 carboxylate groups per molecule. These materials are well known in the lubrication art and can be prepared by reacting a polycarboxylic acid with a mono-hydric alcohol or, alternatively, reacting a mono-carboxylic acid with a polyhydric alcohol. Illustrative of the base stock materials which can be employed in the present invention are the following: dicarboxylates such as oxalates, malonates, succinates, glutarates, adipates, pimelates, suberates, azelates, sebacates and the like; tricarboxlates such as the triesters of trimethylolpropane and tricarboxypentane, tetracarboxylates such as the tetraesters of pentaerythritol; and the higher polycarboxylates such as the esters of di- and tripentaerythritol. Mixtures of these esters can also be employed. When a polycarboxylic acid is used to make the polycarboxylate, the alcohol moiety of these esters normally has between 4 and 18 carbon atoms and preferably from 6 to 12 carbon atoms. Likewise, when a polyhydric alcohol is used to make the polycarboxylate, the carboxylic moiety normally has from 4 to 18 carbon atoms and preferably from 4 to 12 carbon atoms. Mixtures of the above described esters can also be used. The preferred base stocks are of the trimethylolpropane and pentaerythritol ester type. Particularly preferred is a mixture of trimethylolpropane triheptanoate and pentaerythritol monobutyrate triheptanoate. These esters can also be cross-linked by employing a cross-linking agent such as azelaic acid when synthesizing them as is well known in the art.

The base stocks into which the present antioxidants are incorporated can also contain other well known functional fluid additives. Typical of these are the following, with the normal ranges in weight percent of the entire fluid being given in the parenthesis:

(a) Viscosity index improvers such as the polymers of acrylic and metacrylic acid esters which are normally incorporated in a suitable carrier (0.5–5%);

(b) Lubricity and extreme pressure additives of the organo phosphorus type, particularly the organic phosphite, phosphonates, phosphates and amine salts thereof, as exemplified by the hydrogen phosphonates, triaryl phosphates and the amine salts of dialkyl phosphorus acid esters (0.1–5%);

(c) metal deactivators such as benzotriazoles and the N,N'-disalicylidene-dialkyl diamines (.001–1%); and (d) antifoaming agents of the silicone variety, particularly the methyl silicones and siloxanes (0.0001 to 0.002%).

The present invention will be further illustrated by the following examples.

EXAMPLE 1

A two liter flask, fitted with a reflux condenser to which a water trap is attached, is charged with 200 milliliters of toluene, 110.2 grams of N,N'-di-sec-butyl-p-phenylene diamine and 65.1 grams of heptanoic acid. The flask is heated to reflux and maintained at a pot temperature of 275° C. until 9 milliliters of water is formed. The condenser is removed and volatiles are driven off by maintaining the pot temperature at 230° C. The final product weighs 123 grams and is identified by I.R. spectra, gas chromatography and N.M.R. to be N-heptanoyl-N,N'-di-sec-butyl-p-phenylene diamine.

EXAMPLE 2

The product of Example 1 is blended with the functional fluid of Table I(A) to yield the formulation of Table I(B).

The two fluids are tested according to the Alcor Deposition Test, as outlined in the "Proceedings of the United States Air Force Southwest Research Institute—Turbine Engine Lubrication Conference," of Sept. 13–15, 1966.

TABLE I

| Blend | I(A) | I(B) |
|---|---|---|
| Trimethylolpropane triheptanoate | 97.85 | 96.85 |
| Phenyl-α-naphthylamine | 1.15 | 1.15 |
| Dioctyl diphenyl amine | 1.00 | 1.00 |
| N-heptanoyl-N,N'-di-sec-butyl-p-phenylene diamine | | 1.00 |
| Alcor deposition test: | | |
| Overall demerit rating | 91 | 17.4 |
| Critical temperature, ° F | 545 | 580 |
| Tube deposits, mg | 171 | 5.9 |
| Filter deposits, mg | 1.7 | 3.9 |
| Viscosity change, percent | +25.4 | +9.2 |
| Acid number change, mg. KOH/g | +4.08 | +0.80 |

The results contained in Table I demonstrate that the formulation containing the present antioxidants is vastly superior in every category except that of filter deposits where it is comparable and well within normal tolerances.

EXAMPLE 3

A gas turbine lubricant having the composition as shown in Table II is formulated and tested according to Naval Air Systems Command Experimental Specification XAS 2354.

TABLE II

| Base stock: | Wt. percent |
|---|---|
| Pentaerythritol monobutyrate triheptonate cross-linked with azelaic acid | 77.98 |
| Trimethylolpropane triheptanoate | 19.50 |
| N-heptanoyl-N,N'-di-sec-butyl-p - phenylene diamine | 1.2 |
| p,p'-Dioctyl diphenyl amine | 0.8 |
| A phosphorus amine salt [sold under the trade name Vanlube 672, by R. T. Vanderbuilt Co.] | 0.1 |
| Tricresyl phosphate | 0.4 |
| Benzotriazole | 0.02 |
| Dimethyl siloxane | 0.0005 |

This fluid demonstrates exceptional fluid stability and oxidation resistance as seen in the oxidation, high temperature deposition and bearing tests of the above specification.

What is claimed is:

1. A functional fluid antioxidant composition comprising:

(A) a monoacylated phenylene diamine having the formula:

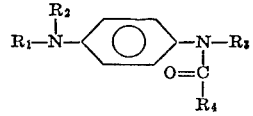

wherein $R_1$ and $R_3$ can each be $C_{1-20}$ alkyl, $C_{5-18}$ cycloalkyl, phenyl, $C_{7-26}$ alkylphenyl, naphthyl, or $C_{11-30}$ alkylnaphthyl, $R_2$ is hydrogen, and $R_4$ can be hydrogen, $C_{1-20}$ alkyl, phenyl, substituted alkyl or substituted phenyl, and (B) at least one secondary aryl amine having the formula

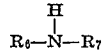

wherein $R_6$ and $R_7$ are each selected from the group consisting of phenyl, naphthyl, $C_{1-20}$ alkyl substituted phenyl and $C_{1-20}$ alkyl substituted naphthyl.

2. The antioxidant composition of claim 1 wherein the acylated phenylene diamine is N-heptanoyl-N,N'-di-sec-butyl-p-phenylene diamine.

3. The antioxidant composition of claim 1 wherein the secondary aryl amine is selected from the group consisting of dioctyl-diphenyl amine, octylphenyl α-naphthyl amine, phenyl-α-naphthyl amine and mixtures thereof.

4. Functional fluid compositions comprising a major proportion of a polycarboxylate base stock having from 2 to 4 carboxylate groups per molecule and as an antioxidant therefore, a mixture comprising:

(A) a monoacylated phenylene diamine having the formula:

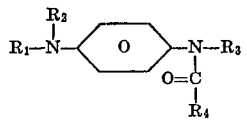

wherein $R_1$ and $R_3$ can each be $C_{1-20}$ alkyl, $C_{5-18}$ cycloalkyl, phenyl, $C_{7-26}$ alkylphenyl, naphthyl, or $C_{11-30}$ alkylnaphthyl, $R_2$ is hydrogen, and $R_4$ can be hydrogen, $C_{1-20}$ alkyl, phenyl, substituted alkyl or substituted phenyl, and (B) a secondary aryl amine having the formula

wherein $R_6$ and $R_7$ are each selected from the group consisting of phenyl, naphthyl, $C_{1-20}$ alkyl substituted phenyl and $C_{1-20}$ alkyl substituted naphthyl; said phenylene diamine and said secondary aryl amine each being present in an amount from about 0.01 to about 10% by weight of the entire fluid.

5. The composition of claim 4 wherein the phenylene diamine is N-heptanoyl-N,N'-di-sec-butyl-p-phenylene diamine.

6. The antioxidant composition of claim 1 wherein the acylated phenylene diamine is N-heptanoyl-N,N'-di-sec-butyl-p-phenylene diamine and the secondary diaryl amine is p,p'-dioctyl diphenyl amine.

7. The antioxidant composition of claim 1 wherein the acylated phenylene diamine is N-heptanoyl-N,N'-di-sec-butyl-p-phenylene diamine and the secondary diaryl amine is a mixture of phenyl-α-naphthylamine and dioctyl diphenyl amine.

8. The antioxidant composition of claim 1 wherein the acylated phenylene diamine and the secondary diaryl amine are present in a weight ratio of from about 3:1 to about 0.3:1.

References Cited

UNITED STATES PATENTS 3,189,650    6/1965    Chenicek _____ 252—403

JOHN D. WELSH, Primary Examiner

U.S. Cl. X.R.

252—76, 77